United States Patent [19]

Bandt et al.

[11] Patent Number: 4,671,414
[45] Date of Patent: Jun. 9, 1987

[54] PROCESS FOR PACKING TUBULAR SHIRRED FOOD TUBULAR CASINGS

[75] Inventors: Hagen Bandt, Eystrup; Heinz Zündorf, Walsrode, both of Fed. Rep. of Germany

[73] Assignee: Wolff Walsrode Aktiengesellschaft, Walsrode, Fed. Rep. of Germany

[21] Appl. No.: 797,764

[22] Filed: Nov. 13, 1985

Related U.S. Application Data

[63] Continuation of Ser. No. 560,042, Dec. 9, 1983, abandoned.

[30] Foreign Application Priority Data

Dec. 28, 1982 [DE] Fed. Rep. of Germany ....... 3248338

[51] Int. Cl.⁴ .................... B65B 9/02; B65B 53/06
[52] U.S. Cl. ..................... 206/802; 53/397; 53/442; 53/450
[58] Field of Search .......... 53/397, 399, 409, 204, 53/442, 450, 463, 466, 483, 553, 557, 591; 206/802

[56] References Cited

U.S. PATENT DOCUMENTS

| | | | |
|---|---|---|---|
| 3,140,572 | 7/1964 | Petersen et al. | 53/450 |
| 3,639,130 | 2/1972 | Eichin et al. | 206/802 |
| 3,686,820 | 8/1972 | Zenger et al. | 53/450 |
| 3,875,723 | 4/1975 | Sundin | 53/389 |
| 3,990,215 | 11/1976 | Elsner et al. | 53/553 |
| 4,282,904 | 8/1981 | Becker et al. | 206/802 |
| 4,346,738 | 8/1982 | Martinek | 206/802 |
| 4,423,584 | 1/1984 | Elsner et al. | 53/446 |
| 4,484,679 | 11/1984 | Liekens et al. | 206/802 |

Primary Examiner—Horace M. Culver
Attorney, Agent, or Firm—Sprung Horn Kramer & Woods

[57] ABSTRACT

A process for the continuously packing shirred tubular food casings in a net, wherein the shirred tubular food casings are introduced parallel and at a mutual spacing between two endless running net film belts and at a right angle to the direction of movement of the belts, the upper net film is sealed with the lower net film in each case between two gathered-up food casings lying parallel, and thus they enclose the casings in the manner of a tube, and the ends of the tubular casings are enclosed by the net films projecting to a greater or lesser extent at both ends of each food casing, depending on the width of the net film belts used, by shrinking and, in so doing, form a circular opening the diameter of which is smaller than the diameter of the shirred food casing.

5 Claims, 6 Drawing Figures

PROCESS FOR PACKING TUBULAR SHIRRED FOOD TUBULAR CASINGS

This application is a continuation of application Ser. No. 560,042, filed Dec. 9, 1983, and is now abandoned.

BACKGROUND OF THE INVENTION

This invention relates to a process for packing shirred tubular food casings, wherein the shirred stick is enclosed by a net packing.

Packed, shirred tubular casings are drawn onto a filling tube for the mechanical production of sausage or similar meat products, and are filled in portions with raw sausage meat.

In this procedure, it is quite conventional to enclose the shirred tubular casing with a tubular net for transport and soaking before filling up.

In the case of net packaging known hitherto, discs have to be positioned at the ends of the shirred tubular casing (shirred stick), for drawing onto the filling tube and for fixing it during an automatic filling procedure on the filling tube.

The known processes for the production of net packings have therefore the great disadvantage that not only a large number of holding discs or rings have to be kept in stack, but also net tubes having the most varied diameters caused by the greatly differing diameter of the food casings.

Moreover, an automatic packing operation of shirred sticks in a net tube is also greatly complicated and expensive due to the insertion of the holding dics into the net tube.

SUMMARY OF THE INVENTION

Therefore an object of the present invention is to improve known processes for packing shirred food tubular casings in nets in such a way that it is possible to dispense with the holding discs or rings and to pack all diameters and all lengths of food casings according to one method, possibly together.

Furthermore, the net tube packing should be produced automatically, and the packed food casing should allow to be used without difficulties for further continuous processing on filling machines.

A good soaking of the food casings before processing must also be provided.

Therefore, the present invention relates to a process for the continuous production of shirred tubular food casings (shirred sticks) which are packed in a net and optionally have not yet been separated, wherein in the shirred sticks are introduced parallel to one another and at a mutual spacing between two endless running net film belts and with the longitudinal axis at a right angle to the direction of movement of the belts, the upper net film is sealed with the lower net film in each case between two shirred sticks lying parallel to one another, the films enclosing the sticks in the manner of a tube, the seal seams in each case between two enclosed sticks form a ridge or a seal edge, and each of the ends of the shirred sticks are enclosed by the net films projecting to a greater or lesser extent, depending on the width of the net film belts used at both ends of each stick, by shrinking under heat, and thus forming a circular opening, the diameter of which is smaller than the diameter of the shirred stick.

DETAILED DESCRIPTION OF THE INVENTION

Figure 1:
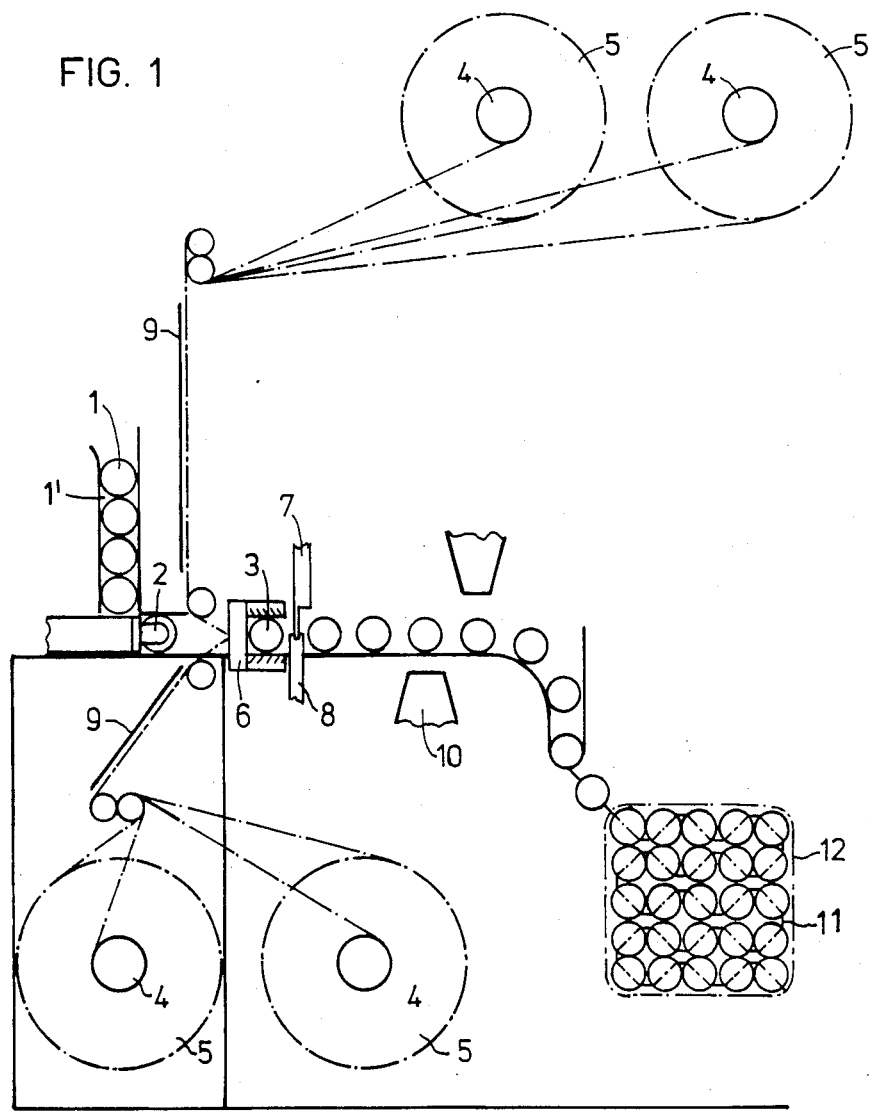
FIG. 1 is a schematic representation of a device for carrying out the process of the invention.

The shirred tubular food casings may preferably be packed according to the present invention, as is schematically shown in FIG. 1. The tubular casings 1 which are shirred to form a hollow stick on a standard shirring machine are introduced manually or, in the case of large piece numbers, automatically into a magazine 1' are fixed at the front at a precise length. The shirred sticks are delivered by a displacement unit 2 to a packing unit 3 into which the net film belts 5 are introduced by rollers 4.

During the displacement the shirred sticks are introduced between the upper and the lower running net film belts and each is sealed into the net film on both sides by means of seal beams 7 and 8 successively. A perforated seam may also be made by the seal beam 7 in the seal ridge which is produced between two shirred sticks, or two packed sticks may be separated at this point. The encased shirred sticks are further conveyer by the lower seal beam 8 up to a hot air fan 10, at which the parts of the net film belts which project at both ends of the stick are shrunk and the stick is thus also fixed axially at its ends. The diameter of the opening of the net packing is essentially determined by the projection of the net film belts.

The packed shirred sticks may be stored as an endless belt in a stacking magazine 11 and they may be fixed with a suitable packing 12.

According to another preferred embodiment, the parts of the net film belts projecting at both ends of the shirred sticks may be turned inside out in part over the net tube enclosing the shirred stick, a projection of the net over the end of the stick remaining. This projecting turned-back part of the net is then twisted radially to the longitudinal axis of the shirred tubular casing and the net tube surrounding it, thus an iris diaphragm-shaped opening is produced, the diameter of which is smaller than the diameter of the shirred stick, and which is also stabilized in shape by the effect of heat, preferably by hot air.

The diameter of the front opening of the net packing may be varied by the length, remaining after turning back, of the net part projecting over the ends of the shirred food casing, but essentially by the size of the twisting angle.

Therefore, this invention also provides shirred tubular food casings which are packed in nets and the packing units are optionally connected by perforated seams which packing unit is characterised in that the packing net has in the axial direction of the shirred stick two opposite seal ridges and, at both ends of the shirred stick has either a circular opening which is thermofixed by shrinking the projecting net by means of heat, or an iris diaphragm-shaped, thermofixed, circular opening, the diameter of which is smaller than the diameter of the shirred stick.

Figure 2:
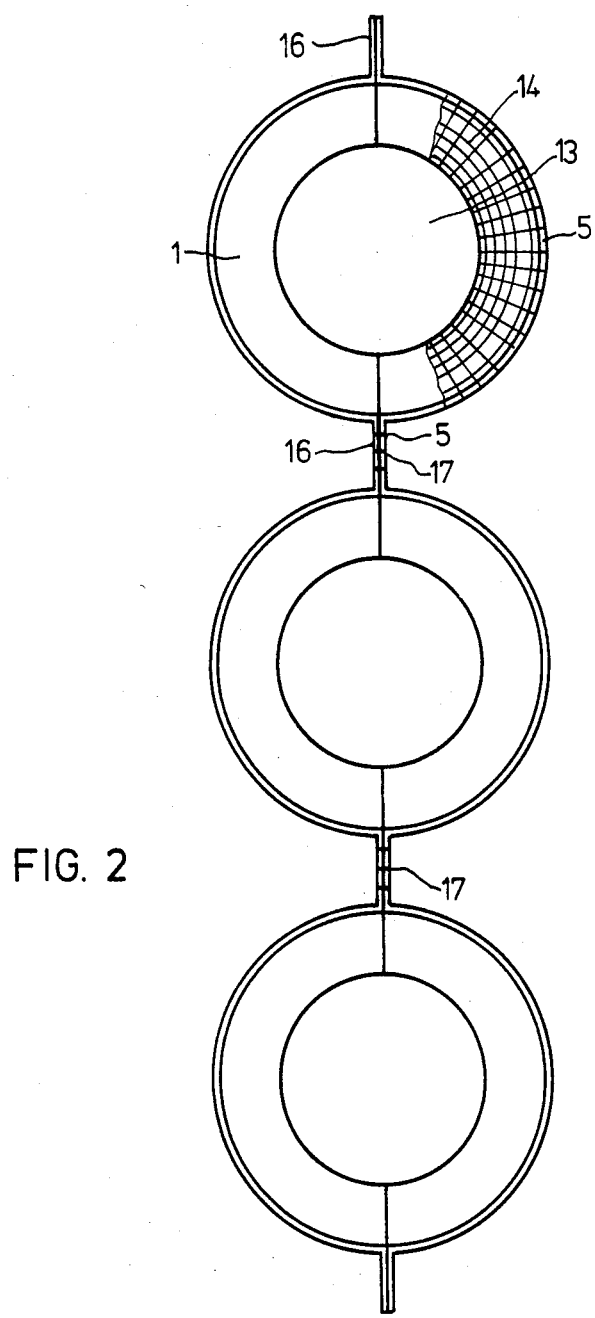
FIG. 2 shows the net film surrounding a food casing.
Figure 3:
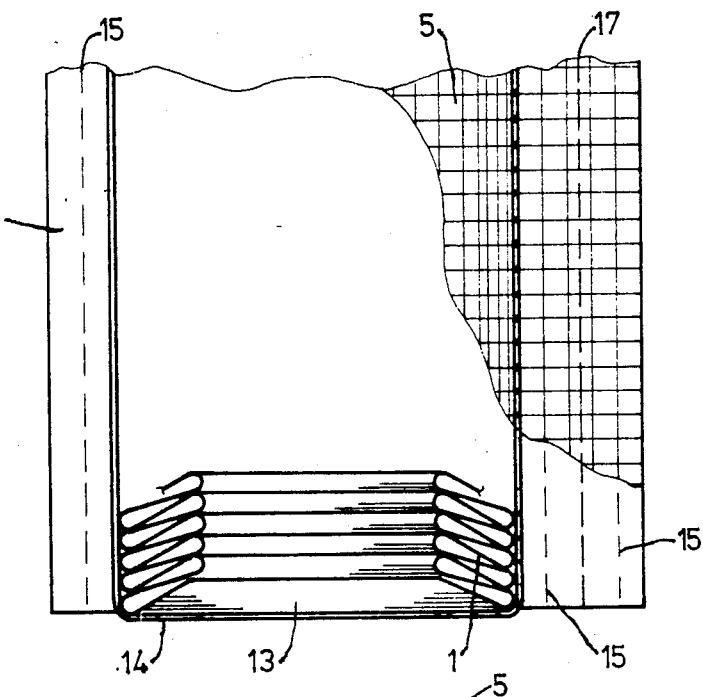
FIG. 3, 4 and 6 are top views of a shirred stick packed in a net according to the invention.
Figure 4:
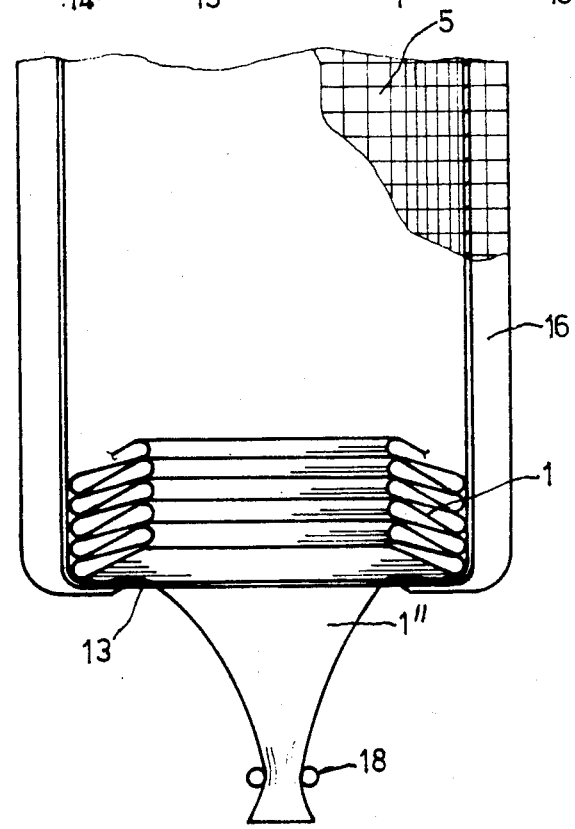

The food casings which are packed according to the inventive process are schematically illustrated in FIG. 2, the front fixing of the shirred sticks 1 being illustrated by the packing. FIG. 2 shows in particular how the net film 5 surrounds 14 the shirred tubular food casing 1 and its end by shrinking the projecting net under heat, thereby forming a circular opening 13, the diameter of which is smaller than the diameter of the shirred stick, but through which the casing may easily be drawn out during the filling procedure. A seal ridge 16 is produced on both sides of the packing due to the sealing of the two net film belts. This seal ridge 16 has a seal seam 15 and a perforated seam 17. FIG. 3 shows a top view of a shirred stick 1 which is packed in a net 5, as described above. FIG. 4 shows a top view of a shirred stick 1 which is 1 which is packed in a net, as described above, the casing end 1″ of which is guided out through the opening 13 formed by the packing net 5 and is closed with a clip 18.

Figure 5:
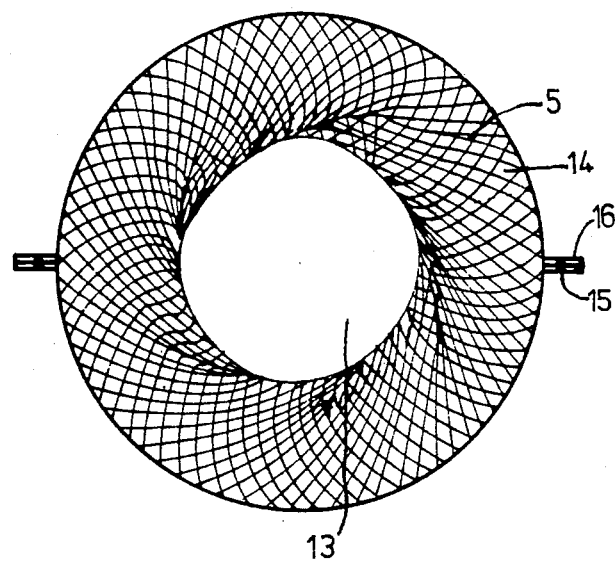
FIG. 5 shows the front opening of the net packing produced according to the invention.

FIG. 5 shows the front opening 13, produced according to the present invention, of the net packing 5 and 14, the iris diaphragm-like design of which is produced by twisting the part of the turned-back net belt.

Figure 6:
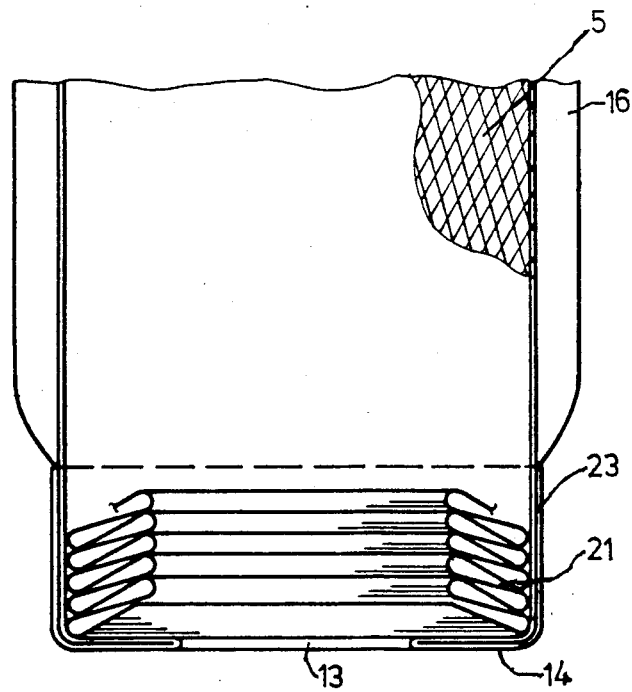

FIG. 6 shows a corresponding top view of a shirred stick 1 which is packed in a net having a seal ridge 16 and the projecting net belts have been turned inside out over the net surrounding the shirred stick in the manner of a sleeve 23, and the iris diaphragm-like opening 13 is formed by twisting the net and thermo-fixing it.

Any known plastics net is suitable as the packing net, preferably polyethylene nets which are optionally used in a double layer.

The shirred tubular food casings which are packed according to the present invention are preferably suitable for being filled on automatically operating filling machines to produce sausages.

We claim:
1. A process for the continuous packing of shirred tubular food casings in nets, comprising:
continuously introducing the casings between upper and lower endless running net film webs with the casings introduced parallel to one another with a space between adjacent casings and with their longitudinal axes perpendicular to the running direction of the webs and wherein the webs extend beyond the ends of the casings; connecting the upper and lower webs along the ridge in each of the spaces between adjacent casings by forming two seams extending parallel to each other and to the longitudinal axis of the casings; enclosing the ends of each casing by shrinking the net at the portions extending beyond the edges of the casings to form a circular opening with a diameter which is smaller than that of the casing and suffciently large to allow the casing to be drawn out.

2. The process according to claim 1, further comprising perforating the ridge between the two parallel seams thereof without disconnecting adjacent packed casings.

3. The process according to claim 1, wherein the step of enclosing further comprises turning the net film inside out at the portion extending beyond the edges of the casings with a portion still extending beyond the edges, circumferentially twisting the turned portion of the web and shirring the portion still extending beyond the edges to form an iris diaphragm-shaped opening having a diameter smaller than that of the casing.

4. The process as claimed in claim 1, wherein the net is a polyethylene net.

5. Shirred tubular food casings packed in a net and several packed units connected via perforated seams obtained by a process as claimed in claim 2.

* * * * *